Patented Sept. 2, 1941

2,254,249

UNITED STATES PATENT OFFICE 2,254,249

MANUFACTURE OF ETHYL CELLULOSE

Richard W. Swinehart and Albert T. Maasberg, Midland, Mich., assignors to The Dow Chemical Company, Midland, Mich., a corporation of Michigan No Drawing. Application March 30, 1940, Serial No. 327,032

5 Claims. (Cl. 260—231)

This invention relates to a method for the manufacture of organo-soluble ethyl cellulose and other lower alkyl ethers of cellulose, specifically, those wherein the substituting alkyl groups contain from 1 to 4 carbon atoms inclusive. It relates in particular to a method of manufacturing ethyl cellulose of a high degree of uniformity, with accompanying consumption of a minimum of the reagents employed, and with improved over-all efficiency as to these reagents.

Past practice in the manufacture, as well as in the small scale preparation of ethyl cellulose, has included the steps of preparing an alkali cellulose by mixing cellulose in various ways with caustic alkali and water, and then heating the alkali cellulose with ethyl chloride or other alkyl halide or sulphate. The heretofore employed methods have resulted in a product which is non-uniform in its degree of substitution, even though, in recent years, the ethyl cellulose methods disclosed have been considerably superior to those first disclosed nearly 30 years ago. Various details have been published as to certain allegedly advantageous proportions of alkali, cellulose and water in the alkali cellulose employed. Other teachings are found directed specifically to the time and temperature of etherification, and to methods of purifying the cellulose ether product, all of the methods purporting to give special advantage in the production of cellulose ethers.

Among the factors generally agreed upon as being most important are the alkali/cellulose and the water/cellulose ratios in the alkali cellulose to be employed. Even with careful control of these ratios within recommended ranges, it has been found that the reaction between the alkali cellulose and ethyl chloride is unduly destructive of ethyl chloride, with concomitant formation of ethyl alcohol and of diethyl ether as by-products. The efficiency of the reaction, calculated on ethyl chloride consumed, is poor. With the best commercial control heretofore realized, the ethyl cellulose produced has exhibited properties indicating it to be of indifferent uniformity. To illustrate, the various degrees of substitution of ethyl cellulose may to some extent be distinguished by the selective solvent action of various single and mixed solvents. Such solubility tests made on the usual ethyl cellulose in the past have shown the product to be non-uniformly substituted.

Practically all of the prior art processes, whether single or multiple stage, have employed either high alkali/cellulose or high water/cellulose ratios, or both. Each of these conditions, and more particularly the latter, result in the conversion of unduly large amounts of ethyl chloride to non-etherifying by-products such as alcohol and diethyl ether. Further, if enough alkali solution of less than 50 per cent concentration is employed so that the cellulose fibers are uniformly penetrated and swollen by the alkali, there is always present, even after expressing excess aqueous alkali, sufficient water to make impractical the subsequent production of a uniform ether. Likewise, if more alkali is used than actually required, the ethyl chloride, or other etherifying agent, tends to react preferentially with the caustic solution rather than with the alkali cellulose. Attempts which have been made to remove water during the etherification have proven both costly and inefficient, particularly since no material improvement in uniformity of the cellulose ether is obtained.

Among the prior proposals for improving on the type of ethyl cellulose produced may be mentioned various recommendations as to methods of manufacture and treatment of the alkali cellulose to provide a particular type of product, and recommendations that, during the etherification, additional amounts of etherifying agent and/or caustic alkali be added from time to time. The last named proposal, considered in gross, contains both advantageous and disadvantageous features. The principal advantage accruing to the method, as practiced according to the prior art references, is that the injurious effects of an excess of water produced as a normal by-product in the reaction may be reduced by adding caustic alkali from time to time, thereby absorbing the water in a solution of such high alkali concentration that it exhibits little tendency to hydrolyze the etherifying agent destructively. The disadvantages of the process, as it has been outlined in the past, have been found to include the facts that the ethyl cellulose produced is not appreciably more uniform and in many instances is less uniform than that obtainable by other methods and the fact that larger amounts of caustic alkali and of ethyl chloride are consumed in the reaction than is economically feasible.

It is accordingly among the objects of the invention to provide a method for the manufacture of ethyl cellulose and of other lower alkyl ethers of cellulose as hereinbefore defined, whereby a highly uniform product may be obtained. Another object is to provide a method whereby the efficiency of the reaction as indicated by ethyl chloride consumption is improved over that obtained according to prior practice. Yet another object is to provide a method whereby the characteristics of the ethyl cellulose produced may be controlled through employment of standard and reproducible reaction conditions. Other objects and advantages will become apparent as the description of the invention proceeds.

In the following description, the amount of alkali present in the reaction vessel at a given time is expressed in two ways. The expression "alkali concentration," employed in this connection, means the actual percentage relation between the weight of alkali present and the weight of alkali plus water. It is a value dependent only on the amounts of alkali and water in the reactor at the given instant. The expression "residual alkalinity" is a control value in which the amount of alkali present is expressed as a percentage of the total weight of the reaction mixture on a substantially ethyl chloride-free basis. The former term is more precise than the latter, though the "residual alkalinity" value may be determined directly and simply and is a convenient means of tracing the progress of the reaction.

It has now been found that the foregoing and related objects may be attained through the employment of a multi-stage etherification reaction to be more fully and completely described hereinafter. In brief, the invention consists in preparing an alkali cellulose containing such an amount of alkali and of water as to be most favorable to the production of an ethyl cellulose of ethoxy content from 34 to 40 per cent, i. e. between 1.5 and 1.9 ethoxy groups per anhydroglucose unit, bringing about a reaction between said alkali cellulose and a large excess of ethyl chloride to produce the low ethoxy ethyl cellulose within the aforesaid range of substitution, adding an amount of caustic alkali to bring the total ratio of alkali to cellulose (based on the original weight of cellulose and including the weight of alkali previously added) to within the range for the production of the desired type of organo-soluble ethyl cellulose, and thereafter continuing the reaction until etherification has ceased, at which point the only reaction continuing is the formation of by-products by interaction between alkali and ethyl chloride, and at this point discontinuing the reaction.

The ethyl cellulose produced in the first stage, i. e. one containing from 34 to 40 per cent ethoxy, is one which is neither water-soluble, alkali-soluble, nor organo-soluble. It has been found that, if additional alkali is added within this range, optimum swelling of the partially etherified product occurs and apparently the ethyl chloride penetrates the fibers while continuing the reaction and is enabled to produce a very uniform ethyl cellulose. If, however, the first supplemental quantity of caustic alkali is added to the reaction mixture when the ethyl cellulose therein contained has an ethoxy value below 34 per cent, it has been found that the final stage of the reaction requires far too long a time, since the partially etherified product is not swelled by the ethyl chloride and the product obtained is non-uniform. Likewise, if the addition of caustic soda is made after etherification has passed 40 per cent ethoxy, it is found that the ethyl chloride efficiency is poor and the partially etherified cellulose is swollen to a firm gel and the reaction mixture can be agitated only with great difficulty and at the expense of undue amounts of energy for a period of from 1 to 3 hours or more, thereby delaying the completion of the reaction and making improbable, if not wholly impossible, the production of a uniform ethyl cellulose.

According to the preferred method of practicing the invention, a cellulose sheet is immersed in a hot bath of concentrated caustic alkali somewhat in accordance with the method described and claimed in U. S. Patent 2,145,862 to Collings et al., employing a caustic soda solution of from 67.5 to 80 per cent, under conditions such that the cellulose is in contact with the alkali solution only long enough to absorb an amount of said solution which will yield an alkali cellulose wherein the alkali/cellulose ratio is within the narrow range from 0.8–1.1/1 and the water/cellulose ratio is within the correspondingly narrow range of from 0.28–0.38/1. The so-formed alkali cellulose is uniformly impregnated with alkali solution, in accordance with the description in the aforesaid Collings patent. The alkali cellulose is sealed in a reaction chamber with a large excess over the theoretical amount of ethyl chloride and the mixture is heated to a reaction temperature which may be within the range of from 60 to 150° C. and ordinarily is in the range of from 90 to 120° C. Heating is continued until the ethyl cellulose in the reaction mixture has an ethoxy value of from 34 to 40 per cent. It has been found that this corresponds to a stage in the reaction at which the aqueous alkali solution present has been reduced, both through the consumption of alkali and by accretion of water, to a concentration in the range from about 30 to about 50 per cent. The "residual alkalinity" at this stage is from about 1 to 8 per cent of the total weight of the reaction mixture. There is then added to the reactor an amount of solid caustic alkali sufficient to bring the alkali solution in the vessel to a concentration of about 55–75 per cent, thus bringing the total ratio of alkali to cellulose, based on the original weight of cellulose present (and including the amount of alkali previously employed in the formation of the original alkali cellulose) to a value varying from about 1.1/1 to about 3/1 according to the type of ethyl cellulose desired. More specifically it has been found that the following table represents approximately the minimum ratio of total alkali to cellulose which must be employed for the production of various substitution types of ethyl cellulose.

TABLE 1

| Desired ethoxy content | Total alkali/cellulose ratio (minimum) |
|---|---|
| 44 | 1.1 |
| 46 | 1.4 |
| 48.5–49 | 1.7 |
| 50 | 2.0 |
| 52 | 2.5 |

The figures in the foregoing table are based upon the presumption that the original alkali/cellulose ratio in the alkali cellulose employed for the primary etherification is within the range of from 0.8–1.1/1 and that the etherification was in the first stage carried to a point within the range of from 34 to 40 per cent ethoxy content in the ethyl cellulose. Under such conditions, the residual alkalinity at the end of the first stage is most frequently found to be in the range of from 2 to 6 per cent. A further presumption has been made that, in accordance with our findings, when ethyl cellulose of from 44 to about 46 per cent ethoxy value is desired, the original alkali cellulose has an alkali to cellulose ratio at the lower end of the range, i. e. of approximately 0.8/1, whereas if the ethyl cellulose is desired of about 50 to 52 per cent ethoxy value the original alkali cellulose has an alkali/cellulose ratio of more nearly 1.1/1, and that the subsequent addition of caustic alkali brings the total alkali/cellulose ratio to the range indicated. It is to be understood that the better the agitation during etherification, the less alkali will be required, down to approximately the values given in the table.

After addition of the solid caustic alkali, etherification is continued at the previously indicated temperature level until the alkali concentration within the reaction vessel has been reduced at least to about 55 per cent but not appreciably below 30 per cent. The ethyl cellulose is separated from the reaction mixture in known manner, washed and purified in accordance with standard practice and is found to be a highly uniform product capable of forming clear, haze-free solutions in a wide variety of single and mixed solvents. A particular advantage to the above described method of manufacture is that the amount of ethyl chloride consumed, expressed as a weight ratio of ethyl chloride to the original weight of cellulose, is usually within the range of from about 1.7 to about 3.5/1, varying directly as the ethoxy value of the ethyl cellulose increases, contrasted with prior experience of about 3.0 to more than 5/1 for the corresponding type of ethyl cellulose. The efficiency of the reaction, expressed in terms of moles of ethyl chloride consumed per ethoxy group formed in the cellulose ether product, varies from less than 2 to slightly more than 3/1. This is a considerable improvement over the efficiency of the reaction practiced according to the methods of the prior art.

The method of the invention has been outlined above in terms of a two-stage etherification, i. e. one in which there is a single supplemental quantity of solid alkali added when the etherification has reached a point within the range of from 34 to 40 per cent ethoxy content in the ethyl cellulose. When ethyl cellulose of ethoxy value over 50 per cent is desired, it has been found that an advantage attaches to the employment of a three-stage process. According to this method the same alkali cellulose is employed as that previously defined and the first stage is terminated when the ethyl cellulose is within the aforesaid range of 34 to 40 per cent ethoxy. Caustic alkali in solid form is added to bring the total alkali/cellulose ratio at least to the value given in Table 1. The amount of alkali employed is sufficient to bring the alkali concentration to a value of from 55 to 75 per cent. Etherification is continued until this alkali concentration is reduced to about 50 per cent, at which time the ethoxy value of the ethyl cellulose is approximately 44 per cent, i. e. the ethyl cellulose contains about 2.15 ethoxy groups per anhydro-glucose unit. A second addition of alkali is made to bring the alkali concentration within the reactor again to a value of from 55 to 70 per cent or more and etherification is continued in the presence of excess ethyl chloride until the alkali concentration has again been reduced to about 50 to 55 per cent. The ethyl cellulose so obtained has an ethoxy value of from 49 to 52 per cent, and ordinarily of about 50 per cent.

In another modification of our multi-stage etherification method, there is made a continuous addition of solid caustic alkali to the reaction mixture after the ethoxy value of the ethyl cellulose has attained a point in the range from 34 to 40 per cent, the addition being made at such a rate that the alkali concentration within the reactor, is kept preferably within the range of about 50 to 60 per cent.

The following table exemplifies the alkali conditions within the reactor at various stages of the etherification procedure. The data given represent conditions actually found in satisfactory runs. The numerals appearing in the table refer to alkali concentration in terms only of the amount of sodium hydroxide and of water present.

TABLE 2

*Percentage of caustic soda concentration*

|  | A | B | C |
| --- | --- | --- | --- |
| Beginning of 1st stage | 73.5 | 75.8 | 74.4 |
| End of 1st stage | 35.4 | 34.7 | 29.9 |
| Beginning of 2nd stage | 71.8 | 74.6 | 53.5 |
| End of 2nd stage | 54.0 | 53.4 | 40.0 |
| Beginning of 3rd stage |  |  | 57.6 |
| End of 3rd stage |  |  | 53.3 |

It is necessary in carrying out the reaction that the concentration of alkali solution as expressed in the foregoing table should not fall materially below about 30 per cent, as it has been found that the rate of saponification of ethyl chloride varies rapidly inversely as the alkali concentration below 90 per cent.

The following examples illustrate the practice of the invention and the comments appurtenant to the said examples explain some of the advantages of the invention. The examples are illustrative only and are not to be construed as limiting:

EXAMPLE 1

Chemical wood pulp in sheet form was continuously unwound from a roll and passed into and through a bath of liquid sodium hydroxide of 76.3 per cent concentration at a temperature of 88° C. at such a rate that the cellulose was in contact with the liquid alkali for a period of only 4.3 seconds. The alkali cellulose sheet so-formed, without the application of intervening pressure to express alkali therefrom, was shredded and cooled. The shredded product was found to consist of 41.7 per cent sodium hydroxide, 14.8 per cent water, and 43.5 per cent cellulose. The alkali/cellulose ratio was 0.95/1 and the water/cellulose ratio was 0.34/1. 47 pounds of this alkali cellulose was suspended in 260 pounds of ethyl chloride in a reaction vessel which was sealed and heated to a temperature of 120° C. After 1.5 hours at this temperature the residual alkalinity was about 2 per cent, and the alkali concentration was about 25 per cent. The reaction vessel was cooled until no pressure was shown on the gauge and a sample taken for analysis. 18.25 pounds of powdered caustic soda was added, increasing the total alkali/cellulose ratio to a value of 1.9/1. The mass was again heated to 120° C. in the course of 30 minutes and reaction was continued at this temperature for 6.5 hours, when the residual alkalinity was about 1 per cent. The ethyl cellulose was separated from the ethyl chloride and was washed free from alkali and salt. The sample taken at the end of the first stage had an ethoxyl value of 35 per cent, i. e. 1.65 ethoxy groups per anhydro-glucose unit. The final product had an ethoxy value of 48.2 per cent, or 2.5 ethoxy groups per anhydro-glucose unit. It formed clear solutions exhibiting at the most a very slight haze in such single solvents as xylene, methanol, butanol and acetone. It formed substantially haze-free solutions in a mixture of 28 per cent ethyl acetate, 37 per cent of 95 per cent ethyl alcohol, and 35 per cent petrobenzol, and in a mixture of 95 per cent of an aromatic naphtha product designated as Union Aromatic No. 8, 3.75 per cent acetone and 1.25 per cent of absolute ethanol. These two mixed solvents are herein referred to as Haze I, and Haze II, respectively.

EXAMPLE 2

Employing reaction conditions similar to those detailed in Example 1, except that different amounts of alkali were added at the end of the first stage of the reaction, there were produced two different types of ethyl cellulose from two batches of equivalent alkali celluloses. The following table outlines the nature of the materials employed and of the products obtained.

TABLE 3

|  | 1 | 2 |
|---|---|---|
| Alkali cellulose: |  |  |
| Percent NaOH | 40.2 | 40.7 |
| Percent H$_2$O | 14.0 | 14.1 |
| Percent cellulose | 45.2 | 44.6 |
| NaOH/cellulose ratio | 0.89 | 0.91 |
| H$_2$O/cellulose ratio | 0.31 | 0.32 |
| End of 1st stage: |  |  |
| Percent residual alkalinity | 1.1 | 3.1 |
| Percent ethoxy | 39.4 | 38.0 |
| Total NaOH/cellulose ratio | 1.2 | 1.95 |
| Final ethyl cellulose: |  |  |
| Percent ethoxy | 44.2 | 48.8 |

EXAMPLE 3

To illustrate the non-uniformity of the cellulose ether obtained when the reaction is interrupted for introduction of alkali before the 34 per cent ethoxy stage is reached and the decrease in ethyl chloride efficiency in the preparation of a given ethoxy type of ethyl cellulose when the alkali addition is made at a stage above 40 per cent ethoxy, the following data are given:

obtained from these runs is as high or higher than those obtained from other runs wherein good solubility was obtained, the inferior solubility characteristics here must be due to non-uniformity of etherification. Runs 3 and 4 in the same table, when compared with runs of higher numbers, show the effect both on the consumption of ethyl chloride and on the uniformity of the product when the first addition of solid caustic is made at a stage above the 40 per cent ethoxy value. To illustrate, the said runs 3 and 4 exhibit a normal consumption of ethyl chloride while yielding a sub-normal final ethoxy content in the ethyl cellulose. It was observed during the runs identified as 3 and 4 and in others carried out in like manner that the addition of caustic soda after the 40 per cent ethoxy stage has been reached leads to the formation of a thick gelatinous mass within the reactor making suitable agitation of that mass impossible for a period of from 1 to 3 hours or more after reaction temperature has again been attained.

EXAMPLE 4

To compare the product of single stage etherification methods of the prior art with those of the multiple stage reaction herein claimed, a series of typical runs were made and the product isolated, bleached, washed, and dried under standard conditions. The following solubility comparisons were made of the various products. In the table the letter G indicates good clear solutions, P poor or partial solutions, the symbol + represents "not to exceed a very slight haze," the degree symbol ° represents the presence of gels in the solutions, and the symbol ' indicates granularity in the solutions.

TABLE 5

|  | Single stage | Two stage | Three stage |
|---|---|---|---|
| Solvent: |  |  |  |
| Troluoil | Insol. | Insol. | Insol. |
| Butyl acetate | G+ | G+ | G+ |
| Carbon tetrachloride | G+° | G+ | G+ |
| Toluene | G+'° | G | G |
| Union aromatic No. 10 | P | G+ | G+ |
| Acetone | G+ | G+ | G+ |
| Haze I | G+ | G+ | G+ |
| Haze II | P | G+ | G+ |

In runs similar to those made to produce the

TABLE 4

| Bomb No. | Alkali cellulose | | First stage | | | | Second stage | | | Final product |
|---|---|---|---|---|---|---|---|---|---|---|
|  | NaOH/Cell. | H$_2$O/Cell. | Time at temp. | Res. alk. | EtO | EtCl/Cell. consumption | Time at temp. | Res. alk. | EtCl/Cell. consumption | EtO |
|  |  |  | Hours | Percent | Percent |  | Hours | Percent |  | Percent |
| 1 | 0.93 | 0.32 | ¾ | 3.5 | 32.1 |  | 15 |  |  | 48.8 |
| 2 | 0.96 | 0.34 | ¼ | 12.5 | 1.5 | 0.10 | 9 | 2.5 | 2.75 | 50.5 |
| 3 | 0.98 | 0.34 | 6 | 0.0 | 40.6 | 1.58 | 7½ | 3.2 | 3.18 | 48.3 |
| 4 | 1.22 | 0.41 | 6 | 0.0 | 42.6 | 1.96 | 5 | 1.7 | 3.12 | 47.6 |
| 5 | 0.82 | 0.29 | 2½ | 0.8 | 37.9 | 1.27 | 5 | 2.3 | 3.21 | 49.3 |
| 6 | 0.82 | 0.29 | 3½ | 0.3 | 38.7 | 1.30 | 5 | 1.4 | 3.13 | 49.4 |
| 7 | 0.94 | 0.32 | 2 | 0.6 | 39.9 | 1.47 | 5 | 2.4 | 3.20 | 49.0 |
| 8 | 0.94 | 0.32 | 3 | 0.1 | 39.6 | 1.51 | 8½ | 2.4 | 3.09 | 49.5 |
| 9 | 0.98 | 0.34 | 1½ | 1.7 | 36.6 | 1.45 | 13¼ | 3.2 | 3.17 | 49.8 |
| 10 | 0.98 | 0.34 | 1½ | 1.5 | 39.7 | 1.47 | 12½ | 1.7 | 3.19 | 49.6 |
| 11 | 0.98 | 0.34 | 4 | 0.0 | 39.8 | 1.58 | 6 | 3.2 | 3.13 | 48.9 |

Runs 1 and 2 in Table 4 were interrupted by the addition of alkali while the ethyl cellulose had an ethoxy value less than 34 per cent, and the final products have poor solubility in the "haze" solvent mixtures defined at the end of Example 1. Since the ethoxy content of the final products products whose solubilities are defined in Table 5, a determination was made of the ethyl chloride consumption at various stages in the processes. Three runs were thus analyzed, a single stage etherification, a two-stage etherification without using an inert diluent and a two-stage etherification carried out in the presence of benzene as a medium for the etherification. In each case the final ethyl cellulose had an ethoxy value between 48 and 49 per cent. The ethyl chloride consumed at various stages in the etherification, expressed in terms of pounds of ethyl chloride used per pound of cellulose originally present, is given herewith.

TABLE 6

| Percent ethoxy | Single stage | Two stage | Two stage with benzene medium |
|---|---|---|---|
| 15 | 1.1 | 0.8 | 0.45 |
| 30 | 1.5 | 1.1 | 0.9 |
| 35 | 2.4 | 1.2 | 1.1 |
| 40 | 2.5 | 1.5 | 1.2 |
| 45 | 2.6 | 2.2 | 1.6 |
| 47.5 | 2.9 | 2.6 | 1.9 |
| 48 | 3.1 | 2.7 | 2.0 |

EXAMPLE 5

A three-stage etherification made according to the invention was carried out as follows: A reaction vessel was charged with 75 pounds of ethyl chloride, 222 pounds of benzene, 57.5 pounds of alkali cellulose containing 41 per cent of sodium hydroxide, 43.5 per cent cellulose, 14.9 per cent water, and to the mixture was added 1.45 pounds of solid caustic soda to make the initial alkali/cellulose ratio 1.0/1. The mixture was heated at 120° C. for 7 hours and a sample analyzed. The ethyl cellulose had an ethoxy value of 34.5 per cent and the ethyl chloride consumed per pound of original cellulose present was 1.15. At this stage 12.5 pounds of solid caustic soda was added to bring the total alkali/cellulose ratio up to 1.5/1, and etherification was continued for an additional 5 hours at 120° C. The ethyl cellulose now had an ethoxy value of 44.3 per cent and the ethyl chloride consumption had risen to 1.56. An additional 15 pounds of caustic soda was added to bring the final and total alkali/cellulose ratio to 2.1/1. Etherification was again continued for 10 hours at 120° C. at which time the ethyl cellulose had an ethoxy content of 48.5 per cent and the ethyl chloride consumption had risen to 1.80. The reaction mixture was removed from the vessel, freed from ethyl chloride and benzene, and the ethyl cellulose was bleached, washed, and dried in the customary manner. The purified product had an ethoxy value of 48.5 per cent and was of excellent solubility in a wide variety of single and mixed solvents.

Other modes of applying the principle of our invention may be employed instead of those explained, change being made as regards the process herein disclosed, provided the step or steps stated by any of the following claims or the equivalent of such stated step or steps be employed.

We therefore particularly point out and distinctly claim as our invention:

1. A process for the manufacture of organo-soluble cellulose alkyl ethers which comprises providing an alkali cellulose containing from 0.8 to 1.1 parts by weight of sodium hydroxide and from 0.28 to 0.38 part by weight of water per part of cellulose, subjecting the alkali cellulose to etherification in the presence of an excess of an alkyl halide containing from 1 to 4 carbon atoms, continuing the reaction with the original reagents until the crude cellulose ether contains from 1.5 to 1.9 alkoxy groups per anhydro-glucose unit, and, commencing at this stage of the etherification, adding sufficient solid sodium hydroxide to increase the amount of total alkali including that formerly present to within the range from 1.1 to about 3 parts by weight per part of cellulose, continuing the etherification until the sodium hydroxide concentration within the reaction vessel has been reduced at least to about 55 per cent but not substantially below about 30 per cent, discontinuing the reaction and isolating the so-formed uniformly substituted cellulose ether.

2. A process for the manufacture of organo-soluble ethyl cellulose which comprises providing an alkali cellulose containing from 0.8 to 1.1 parts by weight of sodium hydroxide and from 0.28 to 0.38 part by weight of water per part of cellulose, subjecting the alkali cellulose to etherification in the presence of excess ethyl chloride, continuing the reaction with the original reagents until the crude ethyl cellulose has an ethoxy content of from 34 to 40 per cent, and, at this stage of the reaction, adding sufficient solid sodium hydroxide to increase the amount of total alkali including that formerly present to within the range from 1.1 to about 3 parts by weight per part of cellulose, continuing the etherification until the sodium hydroxide concentration within the reaction vessel has been reduced at least to about 55 per cent but not substantially below about 30 per cent, discontinuing the reaction and isolating the so-formed uniformly substituted ethyl cellulose.

3. A process for the manufacture of organo-soluble ethyl cellulose which comprises providing an alkali cellulose containing from 0.8 to 1.1 parts by weight of sodium hydroxide and from 0.28 to 0.38 part by weight of water per part of cellulose, subjecting the alkali cellulose to etherification in the presence of excess ethyl chloride, continuing the reaction with the original reagents until the crude ethyl cellulose has an ethoxy content of from 34 to 40 per cent, and, at this stage of the reaction, adding sufficient solid sodium hydroxide to increase the alkali concentration within the reaction vessel to a value within the range of from about 55 to about 75 per cent, continuing the etherification until the said sodium hydroxide concentration has been reduced at least to about 55 per cent but not substantially below about 30 per cent, discontinuing the reaction and isolating the so-formed uniformly substituted ethyl cellulose.

4. A process for the manufacture of organo-soluble ethyl cellulose which comprises providing an alkali cellulose containing from 0.8 to 1.1 parts by weight of sodium hydroxide and from 0.28 to 0.38 part by weight of water per part of cellulose, subjecting the alkali cellulose to etherification in the presence of excess ethyl chloride, continuing the reaction with the original reagents until the crude ethyl cellulose has an ethoxy content of from 34 to 40 per cent, and, at this stage of the reaction adding sufficient solid sodium hydroxide to increase the sodium hydroxide concentration within the reaction vessel to a value within the range of from about 55 to about 75 per cent, continuing the etherification until the said sodium hydroxide concentration has been reduced at least to about 55 per cent but not substantially below about 30 per cent, again adding sufficient solid alkali to bring the sodium hydroxide concentration to within the range of from about 55 to about 75 per cent, and continuing the etherification as before until the sodium hydroxide concentration has been reduced at least to about 55 per cent but not substantially below about 30 per cent, discontinuing the reaction and isolating the so-formed uniformly substituted cellulose ether.

5. A process for the manufacture of organo-soluble ethyl cellulose which comprises providing an alkali cellulose containing from 0.8 to 1.1 parts by weight of sodium hydroxide and from 0.28 to 0.38 part by weight of water per part of cellulose, subjecting the alkali cellulose to etherification in the presence of excess ethyl chloride, continuing the reaction with the original reagents until the crude ethyl cellulose has an ethoxy content of from 34 to 40 per cent, and thereafter continuously adding solid caustic sodium hydroxide at a rate to maintain within the reaction vessel a sodium hydroxide concentration within the range from about 50 to about 60 per cent calculated solely on the basis of the sodium hydroxide and water present, and, after the desired degree of etherification is obtained, discontinuing the reaction and separating the uniformly substituted ethyl cellulose.

RICHARD W. SWINEHART.
ALBERT T. MAASBERG.

CERTIFICATE OF CORRECTION.

Patent No. 2,254,249. September 2, 1941.

RICHARD W. SWINEHART, ET AL.

It is hereby certified that error appears in the printed specification of the above numbered patent requiring correction as follows: Page 3, second column, line 38, for "90 per cent." read --30 per cent.--; and that the said Letters Patent should be read with this correction therein that the same may conform to the record of the case in the Patent Office.

Signed and sealed this 2nd day of December, A. D. 1941.

(Seal)

Henry Van Arsdale,
Acting Commissioner of Patents.